United States Patent
Foser

(10) Patent No.: US 10,746,211 B2
(45) Date of Patent: Aug. 18, 2020

(54) FASTENING METHOD

(71) Applicant: Hilti Aktiengesellschaft, Schaan (LI)

(72) Inventor: Thomas Foser, Balzers (LI)

(73) Assignee: HILTI AKTIENGESELLSCHAFT, Schaan (LI)

( * ) Notice: Subject to any disclaimer, the term of this patent is extended or adjusted under 35 U.S.C. 154(b) by 331 days.

(21) Appl. No.: 15/128,124

(22) PCT Filed: Mar. 31, 2015

(86) PCT No.: PCT/EP2015/056978
§ 371 (c)(1),
(2) Date: Sep. 22, 2016

(87) PCT Pub. No.: WO2015/150361
PCT Pub. Date: Oct. 8, 2015

(65) Prior Publication Data
US 2017/0097025 A1    Apr. 6, 2017

(30) Foreign Application Priority Data

Apr. 3, 2014 (EP) ..................................... 14163294

(51) Int. Cl.
*F16B 5/02* (2006.01)
*F16B 37/00* (2006.01)
*B23B 51/00* (2006.01)

(52) U.S. Cl.
CPC ............ *F16B 5/02* (2013.01); *B23B 51/0081* (2013.01); *F16B 37/005* (2013.01)

(58) Field of Classification Search
CPC .............................. F17L 15/001; F16B 37/005
(Continued)

(56) References Cited

U.S. PATENT DOCUMENTS 131,945 A * 10/1872 Dunlap .................. F16B 39/34
411/301
2,167,559 A * 7/1939 Upson ................. F16B 25/0021
411/415

(Continued)

FOREIGN PATENT DOCUMENTS

DE    297 21 963 U1    1/1998
DE    198 42 173 A1    3/2000
(Continued)

OTHER PUBLICATIONS

Siemens https://community.plm.automation.siemens.com/t5/Solid-Edge-Forum/How-to-calculate-Thread-depth-and-Hole-depth-clearance/td-p/311205 (Year: 2015).*

(Continued)

*Primary Examiner* — Jacob J Cigna
(74) *Attorney, Agent, or Firm* — Leydig Voit & Mayer, Ltd.

(57) ABSTRACT

A method for fastening a component to a base element, in which method there is produced in the base element a blind bore which defines a depth direction and which has a force transmission surface which has a depth T in the depth direction, wherein the force transmission surface is of frustoconical form with a cone opening half-angle (β) and a mean diameter (d), wherein the blind bore has a conical blind bore base with a cone opening angle (α) and, at the edge thereof, a bevel which extends in the depth direction to a bevel depth L, wherein, in the method, a fastening element is anchored in the blind bore by way of the force transmission surface, and wherein the component is held by the fastening element.

19 Claims, 1 Drawing Sheet

(58) Field of Classification Search
USPC .......................................................... 411/918
See application file for complete search history.

(56) References Cited

U.S. PATENT DOCUMENTS

| | | | | |
|---|---|---|---|---|
| 2,772,899 | A * | 12/1956 | Evans | E21B 17/042 285/333 |
| 2,788,829 | A * | 4/1957 | Edwards | F16B 37/005 30/270 |
| 2,908,309 | A * | 10/1959 | Brill | F16B 33/006 411/301 |
| 3,931,993 | A * | 1/1976 | Cope | B01D 65/00 285/200 |
| 4,492,850 | A * | 1/1985 | Yasuda | B23K 35/0205 219/145.1 |
| 4,519,220 | A * | 5/1985 | Burrell | A44C 17/0233 411/303 |
| 4,750,851 | A * | 6/1988 | Thomey | F16B 4/004 411/301 |
| 6,062,263 | A | 5/2000 | Donovan | |
| 6,520,270 | B2 * | 2/2003 | Wissmach | B23B 49/008 173/170 |
| 6,540,462 | B1 * | 4/2003 | Bretschneider | F16B 37/005 411/301 |
| 8,348,577 | B2 * | 1/2013 | Ferslew | F16B 33/02 411/427 |
| 8,657,543 | B2 | 2/2014 | Fabre et al. | |
| 9,022,710 | B2 * | 5/2015 | Konagaya | F16B 33/02 411/366.1 |
| 2014/0335345 | A1 * | 11/2014 | Ambros | C21D 9/0093 428/223 |

FOREIGN PATENT DOCUMENTS

| | | |
|---|---|---|
| DE | 20 2008 000368 U1 | 3/2008 |
| DE | 10 2011 087683 A1 | 6/2013 |
| EP | 1 163 982 A2 | 12/2001 |
| JP | 57-190489 A | 5/1982 |
| JP | 10-47324 A | 2/1998 |
| RU | 2191934 C2 | 10/2002 |

OTHER PUBLICATIONS

Siemens https://web.archive.org/web/20180220132848/http://courses.me.metu.edu.tr/courses/me114/Lectures/screw_threads.htm (Year: 2003).*

Todd, Robert H.; Allen, Dell K.; Alting, Leo (1994), Manufacturing Processes Reference Guide, Industrial Press Inc., pp. 43-48, ISBN 0-8311-3049-0. retrieved via https://en.wikipedia.org/wiki/Drill_bit (Year: 1994).*

Japanese Patent Office, Notice of Reasons for Refusal in Japanese Application No. 2016-559568, dated Oct. 25, 2017.

International Bureau, International Search Report in International Patent Application No. PCT/EP2015/056978, dated Jun. 15, 2015.

European Patent Office, European Search Report in European Patent Application No. 14163294.3, dated Sep. 22, 2014.

* cited by examiner

FASTENING METHOD

CROSS-REFERENCE TO RELATED APPLICATIONS

This patent application is the U.S. National Stage of International Patent Application No. PCT/EP2015/056978, filed Mar. 31, 2015, which claims the benefit of European Patent Application No. 14163294.3, filed Apr. 3, 2014, which are each incorporated by reference.

BACKGROUND OF THE INVENTION

The present invention relates to a method for fastening a component to a base element, wherein a blind bore is produced in the base element, a fastening element is anchored in the blind bore, and the component is held by the fastening element.

Blind bores are usually produced by drills which are equipped with cutting edges at their tips. The cutting edges are arranged inclined relative to a depth direction of the respective blind bore and produce a conical blind bore base by rotation about the depth direction. An edge of the blind bore generally has a bevel, so that between the bevel and the blind bore base a force transmission surface is formed which extends in the depth direction and into which for example a self-tapping thread of the fastening element cuts a counter-thread. The blind bore base and the bevel do not usually contribute anything to a transmission of force between the fastening element and the base element.

In order to achieve the greatest possible holding forces, drilling is usually performed to a sufficient depth and a correspondingly long fastening element is used. In plate-shaped base elements with a predetermined thickness, which furthermore should not be drilled through, the depth of the blind bore and thus the effective length of the fastening element for anchoring in the blind bore is limited.

BRIEF SUMMARY OF THE INVENTION

The object of the present invention is to provide a fastening method, wherein with a given blind bore depth a substantial retaining force of the fastening element in the blind bore is ensured.

The object is achieved by a method for fastening a component to a base element, in which method there is produced in the base element a blind bore which defines a depth direction and which has a force transmission surface of the surface area A which has a depth T less than 10 mm in the depth direction, wherein the force transmission surface is of frustoconical form with a cone opening half-angle β of 0° to 20° and a mean diameter d, wherein the blind bore has a conical blind bore base with a cone opening angle (α) of 60° to 180° and, at the edge thereof, a bevel which extends in the depth direction to a bevel depth L of 0 mm bis 2 mm, wherein the mean diameter d of the force transmission surface A is at least $$d = (1 - \sqrt{k})(T - L)\tan\frac{\alpha}{2}$$

and at most $$d = (1 + \sqrt{k})(T - L)\tan\frac{\alpha}{2}$$

with a maximum surface tolerance k of 0.3, wherein, in the method, a fastening element is anchored in the blind bore by way of the force transmission surface, and wherein the component is held by the fastening element.

In this case the base element is preferably made of a metal or an alloy. The depth T of the blind bore is preferably only somewhat less than a thickness of the base element which is in particular plate-shaped or wafer-shaped. The depth is preferably less than 8 mm, preferably less than 6 mm, for example less than 4 mm. The bevel depth L of the bevel is preferably 0 mm to 0.5 mm, particularly preferably 0 mm to 0.2 mm, for example 0.1 mm, wherein a bevel depth of 0 mm means that the bevel is only present on the microscopic scale.

In the context of the invention the cone opening half-angle of a cone or of a truncated cone is the angle between the generated line and the axis of the respective cone pointing in the depth direction of the blind bore. The cone opening angle is double this amount. The cone opening angle preferably opens, both for the force transmission surface and also for the blind bore base, from the blind bore base to the edge of the blind bore. The mean diameter d of the force transmission surface is the arithmetic mean of the diameter at the two front ends of the truncated cone. At a cone opening half-angle β of 0° the shape of the force transmission surface is a circular cylinder as a special case of the truncated cone. The cone opening angle α of the blind bore base is preferably between 88° and 138°, particularly preferably between 98° and 138°, for example 118°.

The surface tolerance k is the proportion of the maximum possible force transmission surface which is still tolerated as surface loss. The value k=0.3 means that the force transmission surface is at most 30% less than the maximum possible force transmission surface. Preferably k=0.2, particularly preferably k=0.1. With k=0, the maximum possible force transmission surface is achieved with the stated value for the mean diameter d.

The component is preferably already held by the anchoring of the fastening element in the blind bore. According to a preferred embodiment, therefore, the fastening element comprises a head, by means of which the component is held on the base element. Likewise the component is preferably fastened only after anchoring on the fastening element. According to a preferred embodiment, therefore, the fastening element comprises a further load application means, by means of which the component is fastened to the fastening element. Particularly preferably the shank has the further load application means.

A preferred embodiment is characterized in that the blind bore consists of the blind bore base, the force transmission surface and the bevel. The anchoring of the fastening element in the blind bore preferably takes place only via the force transmission surface, preferably by positive engagement, by frictional engagement and/or by cohesive bonding.

A preferred embodiment is characterized in that the fastening element has a shank with a counter-force transmission surface, wherein the counter-force transmission surface interacts with the force transmission surface in order to anchor the fastening element in the blind bore. Particularly preferably the fastening element has an external thread which is for example self-tapping. A preferred embodiment is characterized in that the force transmission surface has an internal thread. Particularly preferably the internal thread is complementary to the external thread of the fastening element.

A preferred embodiment is characterized in that the fastening element is pressed, glued, welded, soldered and/or screwed into the blind bore. The fastening element is preferably made of metal, an alloy or a plastic and is preferably formed as a screw, nail, rivet, pin or bolt, particularly preferably as a threaded bolt.

A preferred embodiment is characterized in that a bevel angle between the bevel and the depth direction is between 30° and 60°. Particularly preferably the bevel angle is between 40° and 50°, for example 45°. A further preferred embodiment is characterized in that a driving angle between a surface of the base element and the depth direction is at least 80°. Particularly preferably the driving angle is at least 85°, for example 90°.

According to a preferred embodiment the blind bore is drilled into the base element. Particularly preferably a drilling machine, in particular electrically operated, is used for this. Likewise the depth T is preferably predetermined with the aid of a stop bit, which has a drill stop particularly preferably formed as a shoulder. The drill is driven into the component and/or the base element until the drill stop rests against a surface of the component or base element. The depth of the blind bore which is then formed as a borehole is as great as the distance of the drill stop from the drill bit of the stop bit. According to an alternative embodiment the depth T is predetermined with the aid of a depth stop of a drilling machine.

According to an embodiment the mean diameter is less than or equal to 8 mm, preferably less than or equal to 7 mm, particularly preferably less than or equal to 6 mm. As a result in some circumstances the blind bore can be produced in a relatively short time with a hand-held drilling machine.

According to a preferred embodiment the mean diameter d is greater than or equal to the depth T, preferably greater than the depth T.

The invention is explained in greater detail below on the basis of embodiments with reference to the drawings, in which:

BRIEF DESCRIPTION OF THE SEVERAL VIEWS OF THE DRAWING(S)

DETAILED DESCRIPTION OF THE INVENTION

Figure 1:
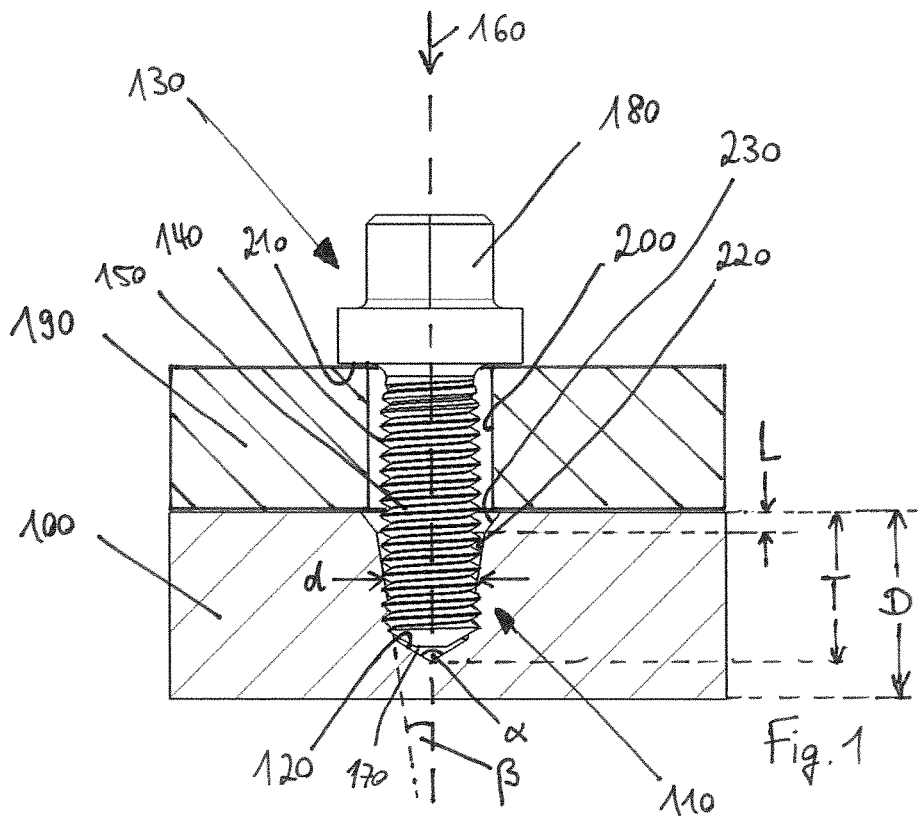
FIG. 1 shows a fastening element fastened to a base element.

In FIG. 1 a plate 100 is shown which, within the context of the invention, constitutes a base element. The plate 100 preferably comprises or consists of metal, in particular aluminum, or an alloy, in particular steel, or concrete, in particular cellular concrete, or plastic or wood, and preferably forms a wall or a floor for example of a ship, a drilling rig or an industrial building. For fastening of a component 190 to the panel 100, a through hole 200 is drilled into the component 190 and a blind bore 110, which defines a depth direction 160 and at a depth T has a blind bore base 120, is drilled into the plate 100. The through hole 200 and the blind bore 110 are preferably drilled one after the other. In the exemplary embodiments which are not illustrated, the through hole and the blind bore are produced in one single drilling operation, for example by drilling through the component into the base element.

The blind bore base 120 is conical with a cone opening angle α. Against the depth direction 160 a force transmission surface 220, which has a surface area A as well as a mean diameter d, adjoins the blind bore base. The force transmission surface 220 is frustoconical with a cone opening half-angle ß. Against the depth direction 160 a bevel 230, which extends from an edge of the blind bore 110 in the depth direction 160 to a bevel depth L and has a bevel angle of for example 45°, adjoins the force transmission surface.

A fastening element formed as a screw 130 with a shank 150, which has a counter-force transmission means formed in particular as a self-tapping thread 140 for transmission of force onto the force transmission surface 220, is screwed into the blind bore 110 in the depth direction 160. In this case the thread 140 extends from an end face 170 of the shank 150 over a length contrary to the depth direction 160 which is greater than the depth T of the blind bore 110. In exemplary embodiments which are not shown, the fastening device is formed as a setting bolt or an expansion bolt, wherein the counter-force transmission means is then formed by a smooth or roughened circumferential surface of the shank. The thread 140 and preferably the shank 150 are formed cylindrically with a diameter which is substantially the same as the mean diameter d. In exemplary embodiments which are not shown, the thread and/or the shank is designed to be frustoconical, preferably with an opening half-angle which is equal to the opening half-angle ß.

In this case D=8 mm, T=7.7 mm, ß=9°, α=118°, L=1 mm and d=8 mm. On the other hand, in exemplary embodiments which are not shown, the parameter values are D=6 mm, T=5.7 mm, ß=0°, α=118°, L=0 mm and d=6 mm, or respectively D=4 mm, T=3.7 mm, ß=0°, α=118°, L=0 mm und d=5 mm.

In order to make the full depth T of the blind bore 110 usable as effectively as possible for transmission of force of the thread 140, on the one hand the depth T is specifically predetermined, wherein the blind bore 110 is drilled for example with a stop bit or by means of a power-operated drilling machine with depth stop. The depth T is only slightly less than a thickness D of the base element 100, preferably less than 0.5 mm, particularly preferably less than 0.2 mm, for example 0.1 mm. On the other hand, in the selection of the screw 130 it should be ensured that the length of the thread is at least as great as the depth T.

The screw 130 has a head 180 which adjoins the shank 150 against the depth direction 160, and the underside of the head facing in the depth direction forms an abutment 210 for pressing the component 190 onto the plate 100. The abutment 210 has an axial spacing along which the thread 140 extends, relative to an end face 170 of the shank 150 along the depth direction 160. The component 190 is clamped between the abutment 210 and the plate 100 as an attachment and thus is fastened to the plate 100. In this case the shank 150 of the screw 130 is preferably screwed into the blind bore 110 until the end face 170 rests or almost rests against the blind bore base 120. This is particularly advantageous when the base element only has a small thickness in the depth direction, so that the available depth of the blind bore is limited.

The head 180 has an external drive formed for example as an external hexagon by means of which the screw 130 is driven into the blind bore 110, in particular by a preferably power-operated screwdriver, for example a cordless screwdriver. In exemplary embodiments which are not shown, the head has an internal drive formed for example as a straight slot, cross slot, hexalobe, internal hexagon or internal square. In further exemplary embodiments which are not shown, the component is fastened to the screw and thus to the plate, wherein preferably an eyelet, a hook or a loop of the component is placed over or attached to the head of the screw.

In exemplary embodiments which are not shown, the fastening element has a further load application means for fastening the component to the base element, which, additionally or alternatively to the head, is arranged on the head or shank and extends in particular contrary to the depth direction. The fastening element is formed for example as a bolt with a thread which is in particular standard, for example a metric or imperial thread, as a further load application means, so that the component is screwed onto the fastening element and thus fastened to the base element in particular by means of a nut. In further exemplary embodiments which are not shown, the screw has an intermediate element which surrounds the shank and which itself comprises a sealing element, preferably an elastomeric element, and/or a covering element. An underside of the head facing in the depth direction preferably forms an abutment for pressing the intermediate element onto the base element. The intermediate element is then clamped between the abutment and the base element.

Figure 2:
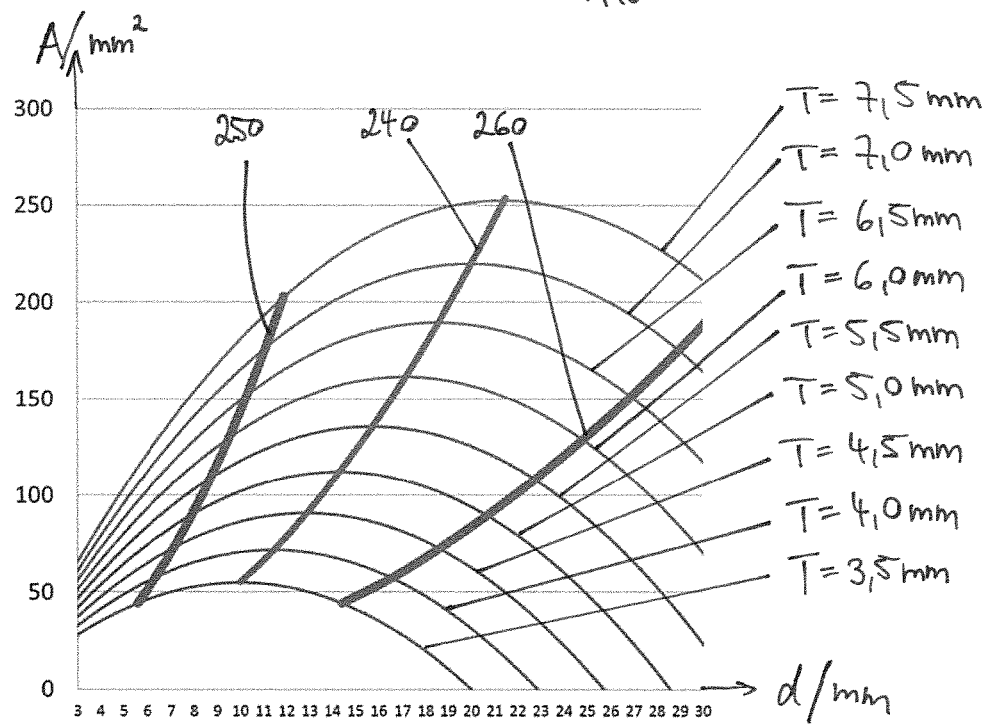
FIG. 2 shows an application of the surface area of the force transmission surface via the mean diameter for different blind bore depths.

In FIG. 2 the surface area A of the force transmission surface is plotted in mm² over its mean diameter d in mm by way of example for various blind bore depths T. The cone opening angle α is 141° for all depicted curves, and the bevel depth L is 0 mm in each case. It can be seen clearly that the surface area A has a distinct maximum for each blind bore depth T, wherein the maxima lie on a curve 240. Likewise, by way of example, for a surface tolerance of k=0.2 a lower boundary line 250 and an upper boundary line 260 are shown, between which the surface area A is reduced at most by 20% relative to its respective maximum value. As can be easily seen, for the surface area A the following correlation applies $$A = \left(-\frac{\pi}{2}d^2/\tan\frac{\alpha}{2}\right) + \pi(T-L)d$$

so that the surface area A is maximum when $$d = (T-L)\tan\frac{\alpha}{2}$$

It is also assumed that the force which can be transmitted, at least in screw connections, is proportional to the surface area of the force transmission surface.

The invention has been described with reference to examples of a device for fastening a component to a base element as well as a method for such fastening. The features of the described embodiments can also be combined with one another in any way within a single fastening device or a single method of production. It is pointed out that the method according to the invention is also suitable for other purposes.

The invention claimed is:

1. A method for fastening a component to a base element, the method comprising producing a blind bore which defines a depth direction and which has a force transmission surface of surface area A which has a depth T with T<10 mm in the depth direction in the base element, wherein the force transmission surface is of frustoconical form with a cone opening half-angle β of 0° to 20° and a mean diameter d, wherein the mean diameter d is greater than the depth T; wherein the blind bore has a conical blind bore base with a cone opening angle α of at least 60° and less than 180°, and, having at an edge of the blind bore, a bevel which extends in the depth direction to a bevel depth L of 0 mm to 2 mm, wherein the mean diameter d of the force transmission surface A is at least $$d = \left(1 - \sqrt{k}\right)(T-L)\tan\frac{\alpha}{2}$$

and at most $$d = \left(1 + \sqrt{k}\right)(T-L)\tan\frac{\alpha}{2}$$

with a maximum surface tolerance k, wherein k=0.3; and, anchoring a fastening element with respect to the force transmission surface, such that the component is held by the fastening element, wherein the fastening element has a shank with a counter-force transmission surface, the counter-force transmission surface having a frustroconical form with a cone opening half-angle β of 0° to 20° that corresponds to, and has the same value as, the force transmission surface cone opening half-angle β of 0° to 20°, and wherein anchoring the fastening element in the blind bore includes interacting the counter-force transmission surface with the force transmission surface.

2. The method according to claim 1, wherein the blind bore consists of the blind bore base, the force transmission surface and the bevel.

3. The method according to claim 1, comprising anchoring the fastening element only by the force transmission surface in the blind bore.

4. The method according to claim 1, wherein the force transmission surface has an internal thread.

5. The method according to claim 1, comprising anchoring the fastening element by pressing, gluing, welding, soldering, and/or screwing into the blind bore.

6. The method according to claim 1, wherein the fastening element is made of metal, an alloy or a plastic.

7. The method according to claim 1, comprising drilling the blind bore into the base element.

8. The method according to claim 1, including predetermining the depth T with a stop bit.

9. The method according to claim 1, including predetermining the depth T with a depth stop.

10. The method of claim 1, wherein the cone opening angle α is 88° to 138°.

11. The method according to claim 1, comprising producing a bevel angle between the bevel and the depth direction of between 30° and 60°.

12. The method of claim 11, comprising producing the bevel angle of between 40° and 50°.

13. The method according to claim 1, comprising producing a driving angle between a surface of the base element angle and the depth direction of at least 80°.

14. The method of claim 13, comprising producing the driving angle of at least 85°.

15. The method of claim 1, wherein the depth T is <8 mm, the cone opening angle α is 88° to 138°, the bevel depth is 0 to 0.5 mm, and k=0.2.

16. The method of claim 15, wherein the depth T is <6 mm, the cone opening angle α is 98° to 138°, and k=0.1.

17. The method according to claim 1, wherein the fastening element has an external thread.

18. The method of claim 17, wherein the external thread is self tapping.

19. The method of claim 18, wherein the force transmission surface has an internal thread that is complementary to the external thread.

* * * * *